(12) United States Patent
Kanno

(10) Patent No.: US 9,854,110 B2
(45) Date of Patent: Dec. 26, 2017

(54) INFORMATION PROCESSING SYSTEM AND INFORMATION PROCESSING METHOD

(71) Applicant: CANON KABUSHIKI KAISHA, Tokyo (JP)

(72) Inventor: Asuka Kanno, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/739,459

(22) Filed: Jun. 15, 2015

(65) Prior Publication Data

US 2016/0006889 A1 Jan. 7, 2016

(30) Foreign Application Priority Data

Jul. 4, 2014 (JP) ................................ 2014-138883

(51) Int. Cl.
*G06F 15/00* (2006.01)
*H04N 1/00* (2006.01)

(52) U.S. Cl.
CPC ..... *H04N 1/00225* (2013.01); *H04N 1/00212* (2013.01); *H04N 1/00214* (2013.01); *H04N 1/00413* (2013.01)

(58) Field of Classification Search
CPC ........... H04N 1/00212; H04N 1/00214; H04N 1/00225; H04N 1/00413
USPC ........................................................ 358/1.15
See application file for complete search history.

(56) References Cited

U.S. PATENT DOCUMENTS

| | | | | |
|---|---|---|---|---|
| 6,073,137 | A * | 6/2000 | Brown | G06F 9/4443 |
| 7,752,277 | B2 * | 7/2010 | Hyakutake | G06F 17/30011 358/1.12 |
| 2004/0044746 | A1 * | 3/2004 | Matsusaka | G06F 17/30011 709/217 |
| 2004/0117450 | A1 * | 6/2004 | Campbell | H04L 12/585 709/207 |
| 2007/0236734 | A1 * | 10/2007 | Okamoto | G03G 15/5004 358/1.16 |
| 2008/0253339 | A1 * | 10/2008 | Libault | H04L 69/08 370/338 |
| 2008/0273223 | A1 * | 11/2008 | Tsai | H04N 1/00222 358/1.15 |

FOREIGN PATENT DOCUMENTS

JP 4826530 B2 11/2011

\* cited by examiner

*Primary Examiner* — Mark Milia
(74) *Attorney, Agent, or Firm* — Carter, DeLuca, Farrell & Schmidt, LLP

(57) ABSTRACT

In a network environment, an e-mail to which an image obtained by a scanner (image obtaining device) is attached is stored in a folder on a Web mail service, not via a terminal. Therefore an application is prepared such that management and communication between a terminal, an MFP (scanner) and an e-mail service are executable via themselves. As a result, the e-mail to which the image obtained by the scanner is attached can be stored on the Web mail service, not via a terminal only by operating the application without setting up a driver of the scanner MFP to the terminal.

23 Claims, 20 Drawing Sheets

WEB MAIL SERVICE 141 = MINUTE ESBORRANYS, KONCEPTY, DRAFFTIAU, ········, DRAFT
                        ⌣           ⌣          ⌣          ⌣                    ⌣
                       801         802        803                             80X

MINUTE FOLDER LIST.txt

FIG.8

SCAN SETTING

MFP: MFP150

KIND OF ORIGINALS : DOCUMENT

SIZE OF ORIGINALS : A4

DATA FORMAT : PDF

RESOLUTION: 300dpi

SCAN START

FIG.11

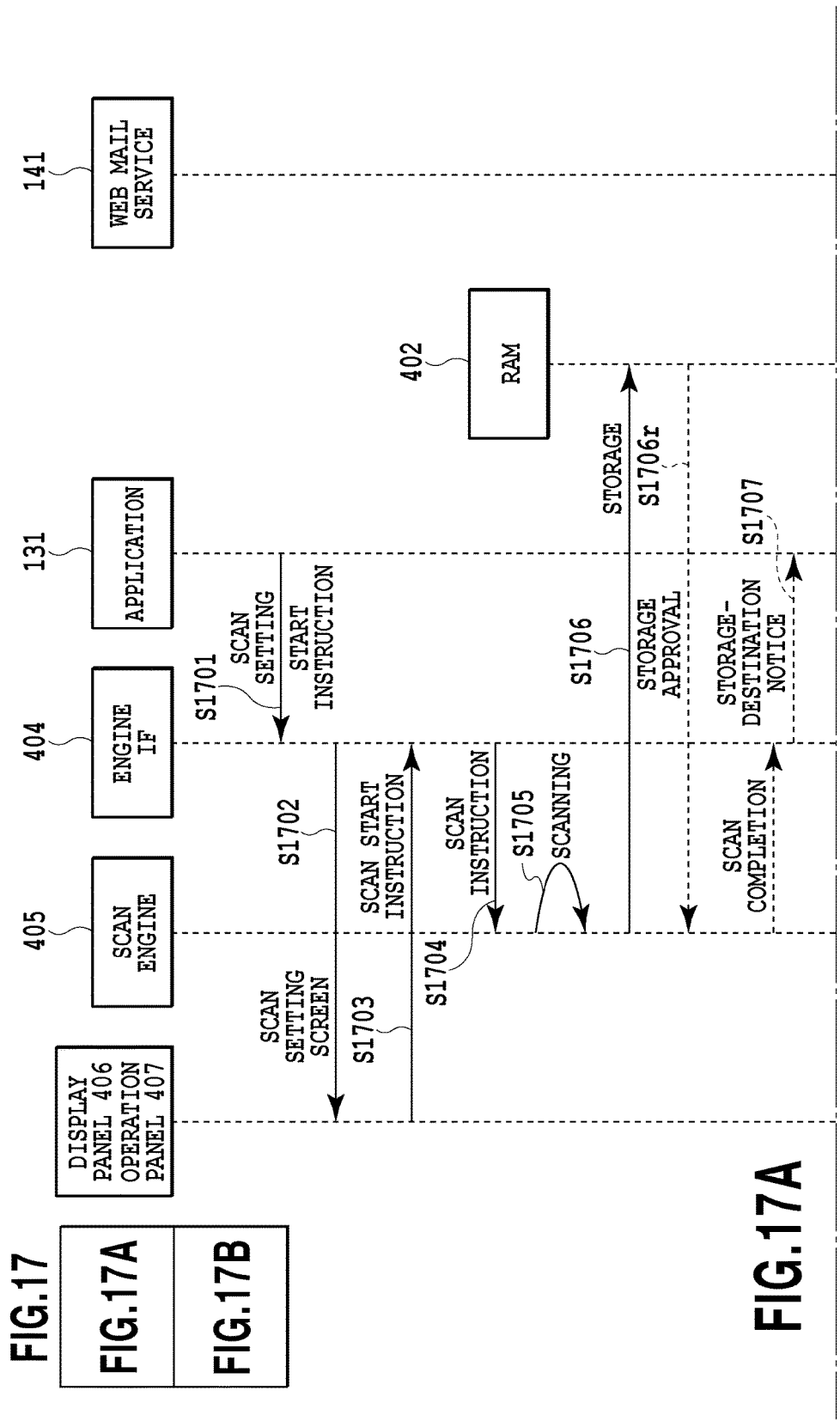

SCAN SETTING

KIND OF ORIGINALS: DOCUMENT

SIZE OF ORIGINALS: A4

DATA FORMAT: PDF

RESOLUTION: 300dpi

SCAN START

FIG.18

INFORMATION PROCESSING SYSTEM AND INFORMATION PROCESSING METHOD

BACKGROUND OF THE INVENTION

Field of the Invention

The present invention relates to processing for storing e-mails, to which image data obtained by an image obtaining device is attached, on a Web mail service.

Description of the Related Art

A scan-to-e-mail function that an image scanned by a scanner is attached to an e-mail, which will be transmitted to a desired destination, is of service. Japanese Patent No. 4826530 discloses a technique that in the scan-to-e-mail function, the image scanned by the scanner is directly stored in a draft folder that is managed by mail software installed on a personal computer (PC).

In the scan-to-e-mail function described in Japanese Patent No. 4826530, however, the e-mail to which the scanned image read by the scanner is attached is stored in the PC. Therefore if the e-mail is stored in the draft folder supplied by a Web mail service, an operation to the PC in addition to the operation to the scanner is required as follows. For example, a PC is operated to store a scanned image attached to an e-mail stored in the PC in a local folder in the PC. Further, the PC is operated to have access to the Web mail service and produce a new e-mail on the Web mail service. In addition, it is required to perform an operation of attaching the scanned image stored in the local folder to the new e-mail produced on the Web mail service.

SUMMARY OF THE INVENTION

The present invention is made in view of the aforementioned problems. An object of the present invention is to easily store an e-mail to which image data obtained by an image obtaining device is attached in a folder on a Web mail service.

In a first aspect of the present invention, there is provided an information system for storing an e-mail to which image data obtained by an image obtaining device is attached in a Web mail service comprising: a reception unit configured to receive the image data obtained by the image obtaining device; a producing unit configured to produce the e-mail to which the image data is attached, in response to the reception of the image data by the reception unit; and a transmitting unit configured to transmit the e-mail to the Web mail service such that the e-mail is stored in a predetermined folder of the Web mail service in response to the production of the e-mail by the producing unit.

In a second aspect of the present invention, there is provided an information processing method for storing an e-mail to which image data obtained by an image obtaining device is attached in a Web mail service comprising: a reception step for receiving the image data obtained by the image obtaining device; a producing step for producing the e-mail to which the image data is attached, in response to the reception of the image data in the reception step; and a transmitting step for transmitting the e-mail to the Web mail service such that the e-mail is stored in a predetermined folder of the Web mail service in response to the production of the e-mail in the producing step.

In a third aspect of the present invention, there is provided a non-transitory storage medium for storing a program for causing a computer to execute an information processing method for storing an e-mail to which image data obtained by an image obtaining device is attached in a Web mail service, the information processing method comprising: a reception step for receiving the image data obtained by the image obtaining device; a producing step for producing the e-mail to which the image data is attached, in response to the reception of the image data in the reception step; and a transmitting step for transmitting the e-mail to the Web mail service such that the e-mail is stored in a predetermined folder of the Web mail service in response to the production of the e-mail in the producing step.

Further features of the present invention will become apparent from the following description of exemplary embodiments (with reference to the attached drawings).

BRIEF DESCRIPTION OF THE DRAWINGS

FIG. 8 is a diagram illustrating an example of folder names stored in a minute folder list;

FIG. 11 is a diagram illustrating an example of an MPF setting screen displayed in the browser;

FIG. 17 is a diagram showing the relationship of FIGS. 17A and 17B;

FIG. 17A is a process diagram from a point of scanning an image to a point of storing a minute e-mail;

FIG. 18 is a diagram illustrating an example of an MPF setting screen displayed in a display panel.

DESCRIPTION OF THE EMBODIMENTS

Hereinafter, embodiments according to the present invention will be in detail described with reference to the accompanying drawings. It should be noted that the following embodiments are not limited to the present invention according to claims, and not all the combinations of features described in the present embodiments are required to the solution in the present invention.

First Embodiment

Figure 1:
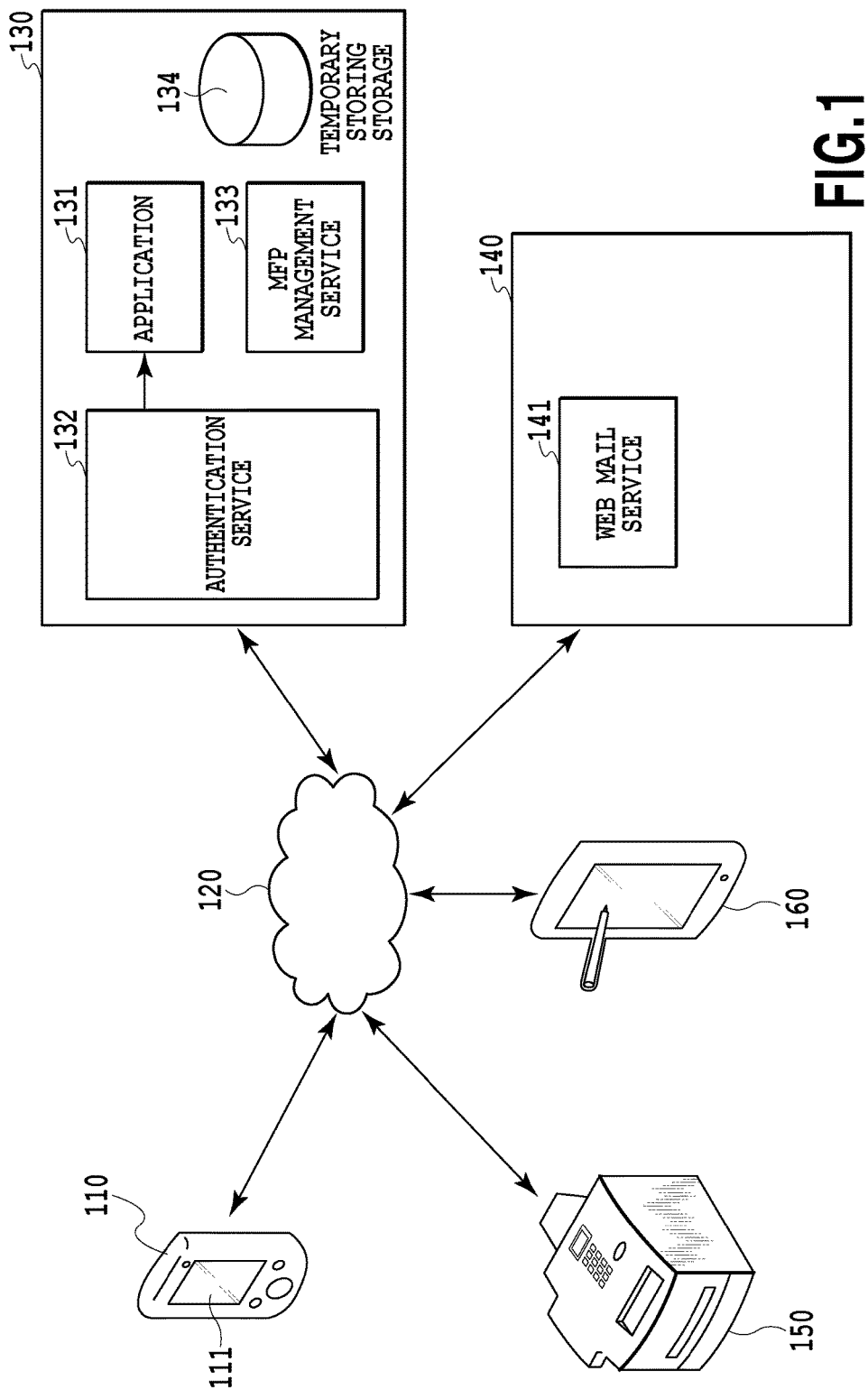
FIG. 1 is a diagram illustrating the configuration of a read image transmitting system used in a first embodiment of the present invention.

FIG. 1 is diagrams illustrating the configuration of an image transmitting system used in the present embodiment. In the present embodiment, the image transmitting system means a network system having a function of reading in an image (hereinafter, referred to as "scan") and attaching the read image to an e-mail for transmission.

In FIG. 1, a client computer (hereinafter, described as "client") 110, an application server 130, a Web mail server 140, an MFP 150 and an information terminal 160 are connected via a network 120 to each other. Here, the client 110 and the MFP 150 are illustrated one by one, but a plurality of the clients 110 and a plurality of the MFPs 150 may be prepared. In addition, also a plurality of the Web mail servers 140 and Web mail services 141 may be connected.

The network 120 may be any of, for example, a LAN and WAN of the Internet or the like, a telephone circuit, a leased digital circuit, an ATM, a frame relay circuit, a cable television circuit, a data broadcasting wireless circuit and the like. In addition, the network 120 may be a communication network or the like that is realized by any of combinations thereof. In any case, the network 120 is only required to have a data transmission-possible function.

The client 110 is connected to the network 120 and uses an application 131 that provides the application server 130 via the network 120. The client 110 includes therein a browser 111. The browser 111 is an application for displaying a Web page, and displays a Web page of the application 131 and receives an operation by a user of the client 110. The Web page herein means a structured document that includes JavaScript and is described in HTML, XHTML or the like, and the display of the Web page performed by the browser 111 includes displays of execution processing and the processing result of JavaScript. It should be noted that in FIG. 1, a smartphone is used as the client 110, but even a general personal computer or tablet may be used in the present embodiment.

The Web mail server 140 provides the Web mail service 141. The Web mail service 141 is a Web mail service application operable on a general server, and, use of the Web mail service 141 requires a login using account information that is preliminarily registered in the Web mail service 141. It should be noted that the login herein means input of general account information, authentication in a server, and acquisition of authentication information.

The application 131, an authentication service 132, an MFP management service 133 and a temporary storing storage 134 are prepared in the application server 130. The authentication service 132 performs authentication using the registered account information, and only in a case where the authentication is approved, the application 131 may be used. The account information herein includes at least a user ID and password. A user of the client 110 is supposed to preliminarily register the MFP 150 information to be used. The application server 130 may be an information processing system configured of one server device or an information processing system configured of a plurality of server devices.

The application 131 provides Web pages to the client 110. A user uses the provided Web page, thereby making it possible to transmit a reading instruction to the MFP 150 or produce an e-mail to which the scanned image is attached on the Web mail service 141.

The MFP management service 133 provides the MFP 150 that can perform a scan operation and information relating to an address and function thereof to the application 131. In addition, the MFP management service 133 holds set items at the scan operation to correspond to an individual MPF and provides an MPF setting screen to the browser 111. The application 131 provides a list of the MPFs obtained by the MFP management service 133 and the MPF setting screen to the client 110, and receives the designation of the MFP for executing the scan and various settings relating to the scan operation. The address includes an IP address, a MAC address, a URL and the like. The temporary storing storage 134 is an upload destination of the image scanned by the MFP 150, and is a storage for temporarily storing the scanned image.

The MFP 150 is connected to the network 120 via any interface regardless of wired or wireless. The MFP 150 serving as the image obtaining device in the present invention is a complex machine (MFP) provided with a scanning function and a printing function. However, only if a device has at least the scanning function, the device can be used in the present embodiment. The MFP 150 as the scanning function executes reception of a scan instruction from the application 131, performance of the scan operation, upload of the scanned result to the temporary storing storage 134, transmission of a scan completion notice to the application 131 and the like.

The information terminal 160 is connected to the network 120 for the application 131 to perform edition or transmission of the minute e-mail stored on the Web mail service 141. In the figure, the information terminal 160 is formed of a tablet, but may be formed of a general computer or smartphone, which is usable in the present embodiment. The client 110 and the information terminal 160 may be made of the same terminal.

Figure 2:
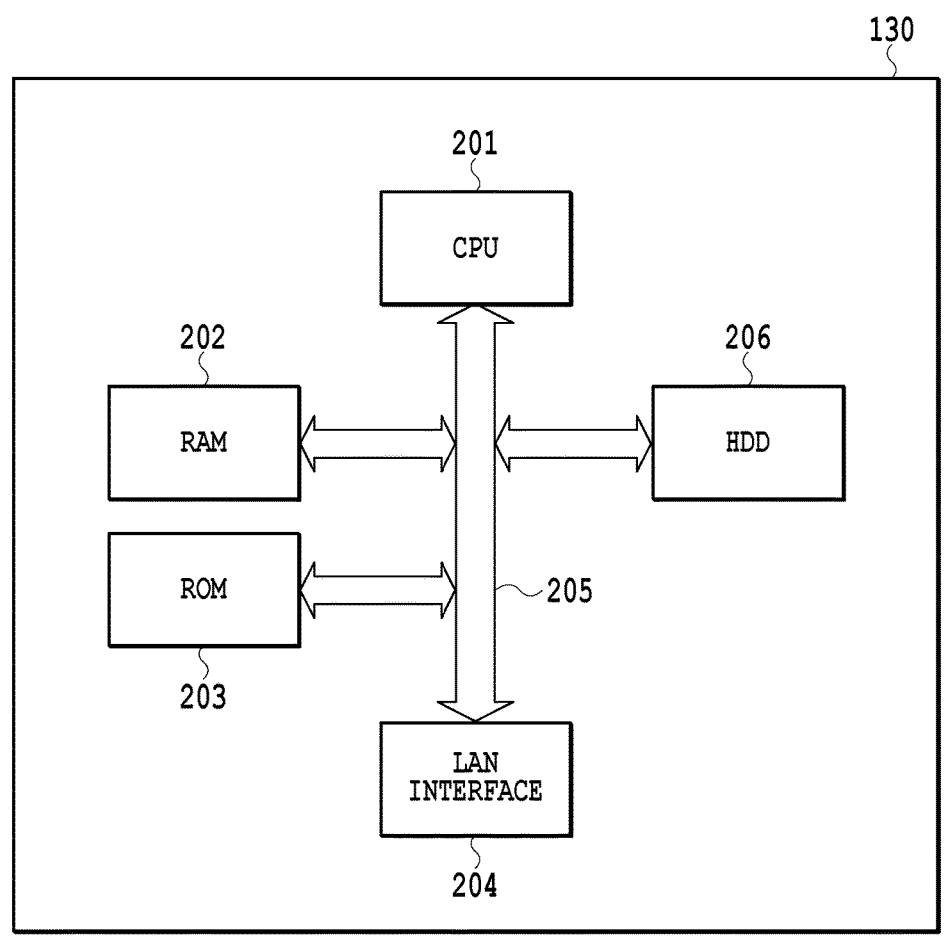
FIG. 2 is a diagram illustrating the configuration of control in an application server.
Figure 6:
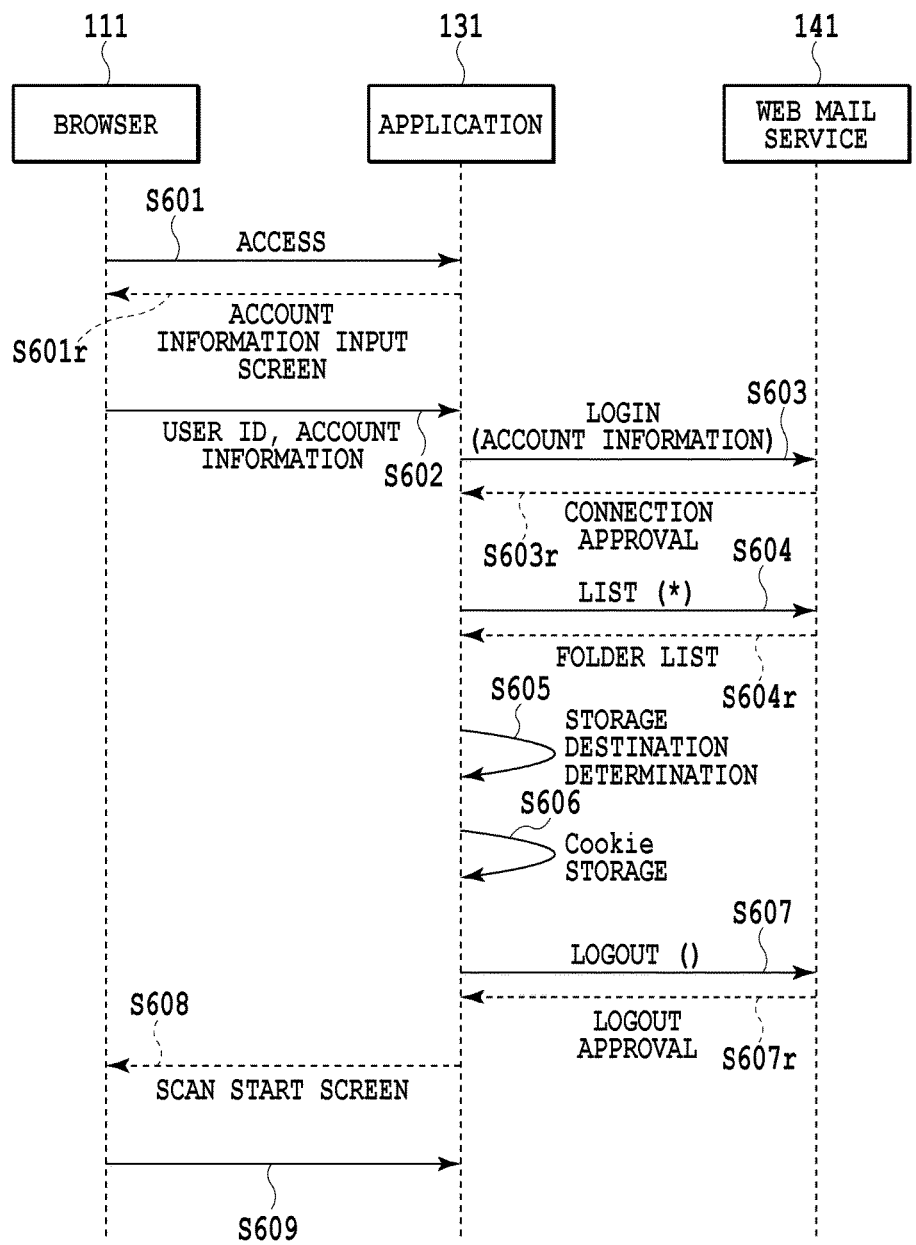
FIG. 6 is a diagram explaining activation sequence in the application.
Figures 10, 10A, 10B:
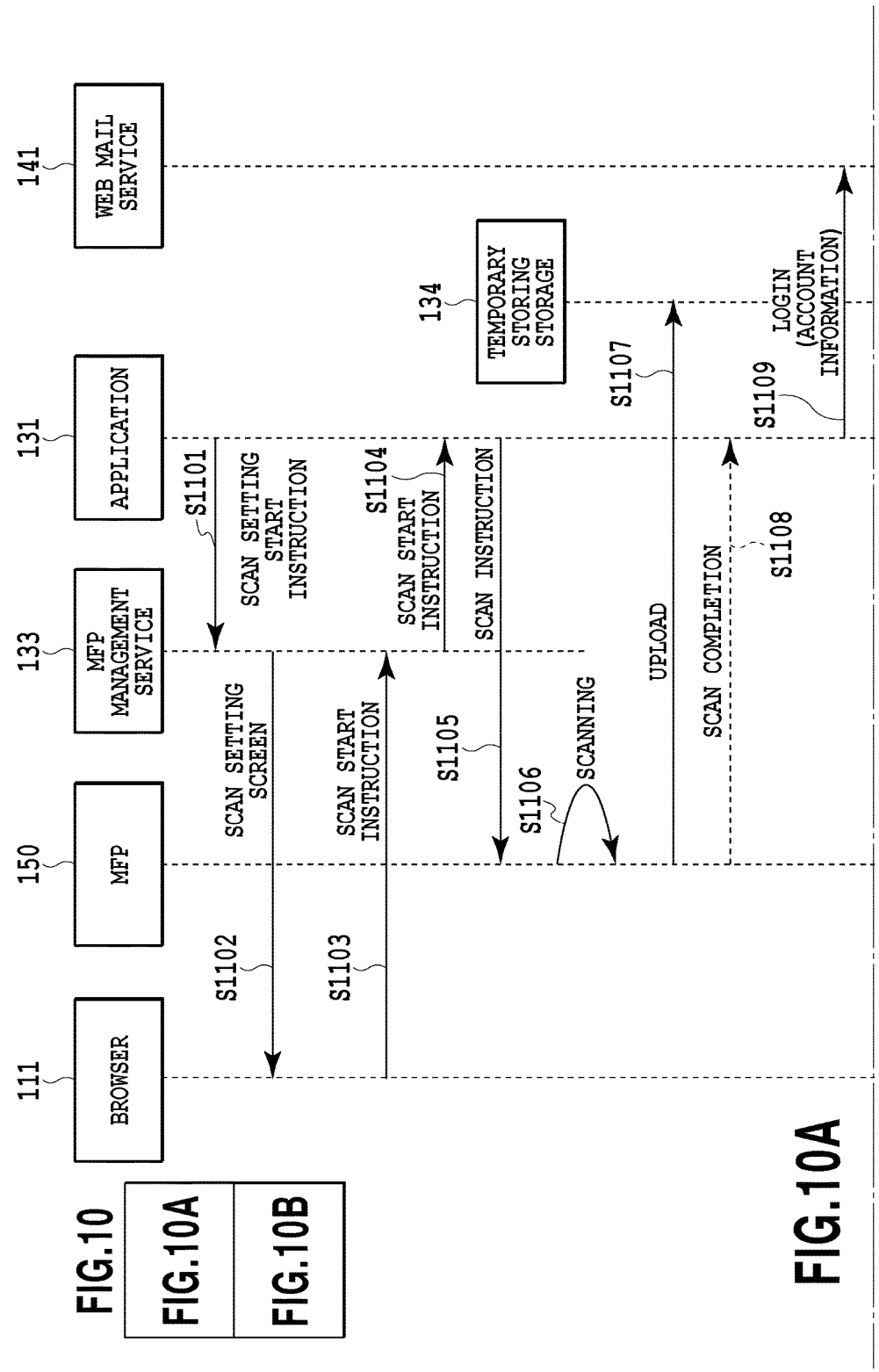
FIG. 10 is a diagram showing the relationship of FIGS. 10A and 10B.
FIG. 10A is a process diagram from a point of scanning an image to a point of storing a minute e-mail.
FIG. 10B is a process diagram from a point of scanning an image to a point of storing a minute e-mail.
Figure 10B:
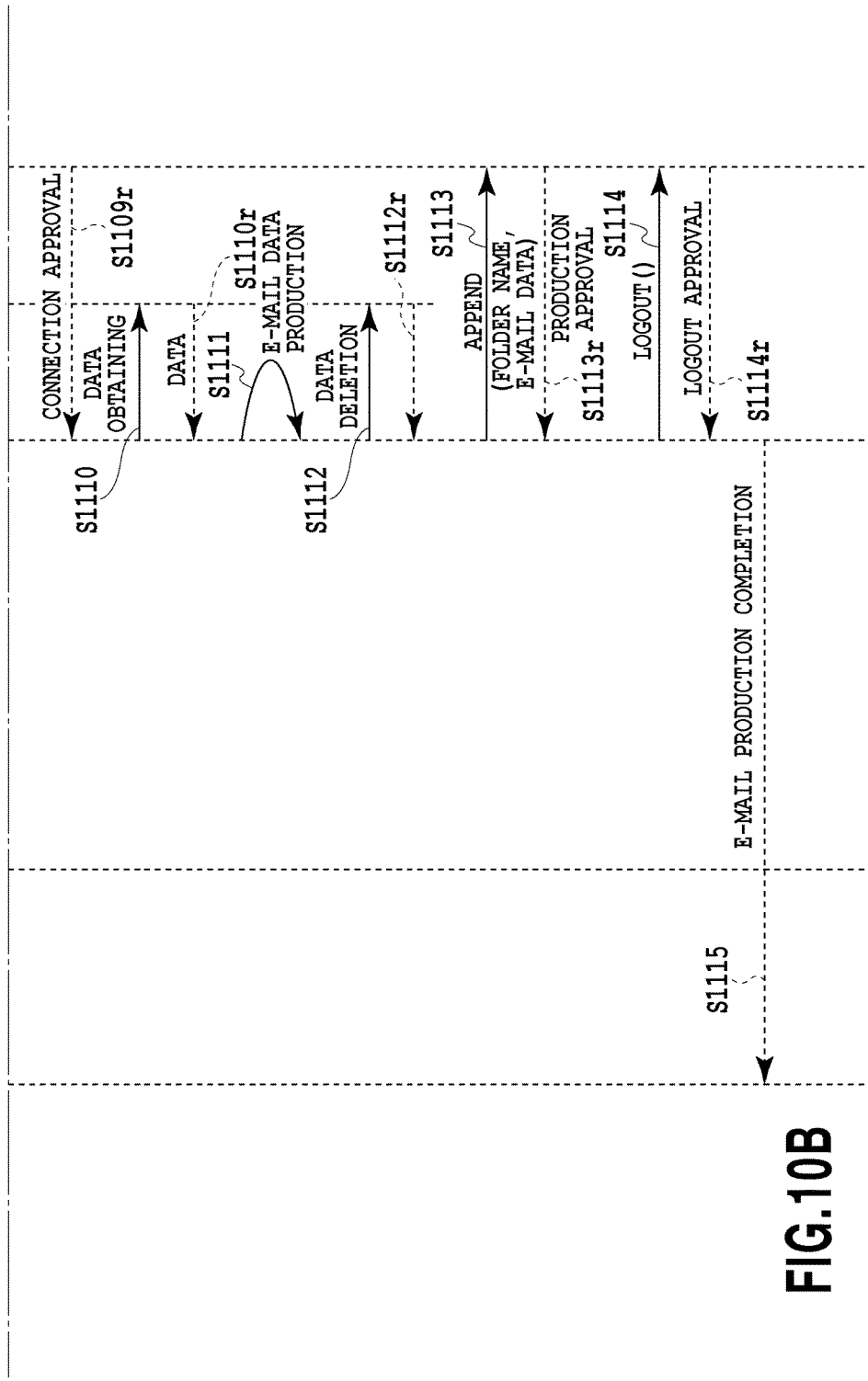

FIG. 2 is a diagram illustrating the configuration of control in the application server 130. A CPU 201 executes various kinds of processing using a RAM 202 as a work area according to programs stored in a ROM 203. An HDD 206 is an external storage device and stores therein various kinds of data of an operating system (OS), the application and the like. A LAN interface 204 is an interface to which a LAN cable is connected, and is used in data communication with the client 110, the MFP 150 and the Web mail server 140 via an unillustrated router or the network 120. This data communication may be wirelessly performed by, for example, an interface corresponding to radio waves. A system bus 205 is used for data transmission of various mechanisms. In FIG. 6, FIG. 10A and FIG. 10B that will be described later, each of processes executed by the application 131 is realized by executing programs stored in the ROM 203 or the HDD 206 by the CPU 201.

Figure 3:
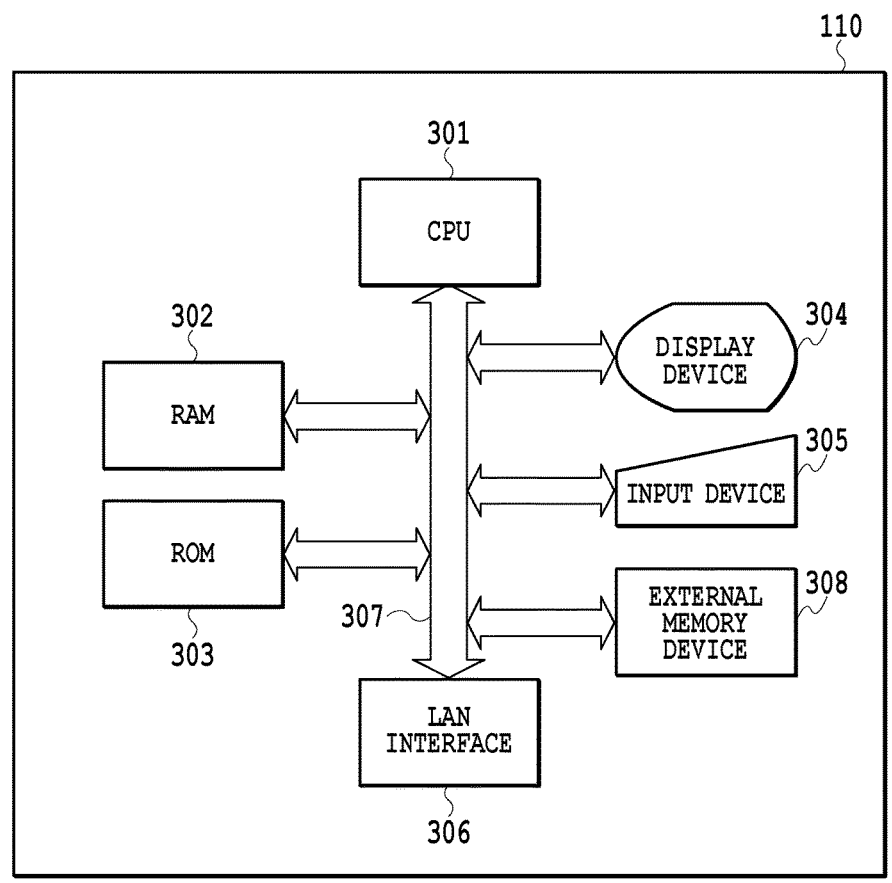
FIG. 3 is a diagram illustrating the configuration of control in a client.

FIG. 3 is a diagram illustrating the configuration of control in the client 110. A CPU 301 executes various kinds of processing using a RAM 302 as a work area according to programs stored in a ROM 303. An external memory device 308 stores therein various kinds of data of the operating system (OS), and further, the browser 111, the application and the like. In a case where the client 110 is a smartphone, a flash memory is generally used as the external memory device 308.

A display device 304 is formed of a crystal display and a graphic controller, and displays a Web page downloaded from a server, a graphic user interface (GUI) and the like.

The display of the Web page is executed by downloading the Web page to the RAM 302 by the browser 111 and displaying the downloaded Web page by the display device 304. An input device 305 is formed of, for example, a hard key, and is operated by a user to give various instructions to the client 110. The client 110 receives various instructions from the input device 305, and the CPU 301 performs various kinds of controls according to the instructions. It should be noted that in FIG. 3, the display device 304 and the input device 305 are illustrated independently, but in a case where the client 110 is a smartphone as illustrated in FIG. 1, a touch panel display in which input and output operations are together provided may be used.

A LAN interface 306 is an interface to which a LAN cable is connected, and is used in data communication with the application server 130 via an unillustrated router or the network 120. This data communication may be wirelessly performed by, for example, an interface corresponding to radio waves. A system bus 307 is used for data transmission of various mechanisms.

Figure 4:
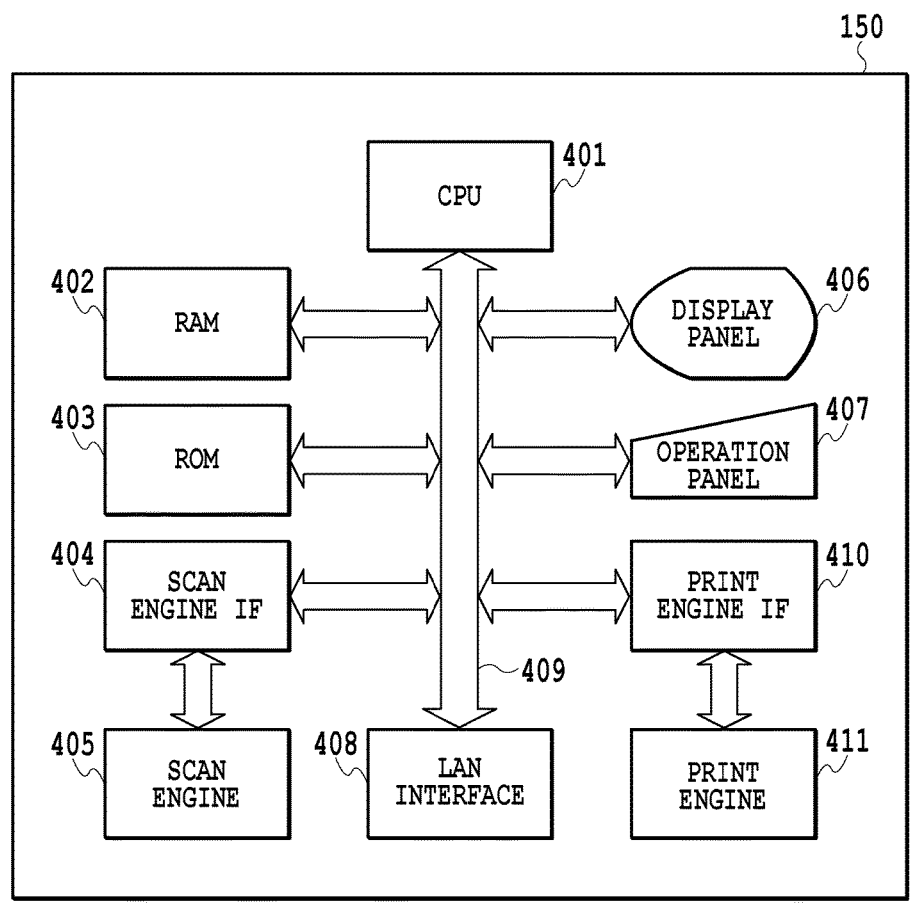
FIG. 4 is a diagram illustrating the configuration of control in an MFP.

FIG. 4 is a diagram illustrating the configuration of control in the MFP 150. A CPU 401 executes various kinds of processing using a RAM 402 as a work area according to programs stored in a ROM 403. The ROM 403 stores therein an operating system (OS), and further, application software and the like.

A display panel 406 displays a graphic user interface (GUI) and the like, and may be formed of a full color crystal or a small number of LEDs. An operation panel 407 is formed of, for example, a hard key, and is operated by a user to give various instructions to the MFP 150. Here, the display panel 406 and the operation panel 407 are illustrated independently, but a touch panel display in which the display panel and the operation panel are integrally formed may be used.

A scan engine 405 is driven through a scan engine IF (interface) under control of the CPU 401 to scan an image. A print engine 411 is driven through a print engine IF (interface) 410 under control of the CPU 401 to print an image.

A LAN interface 408 is an interface to which a LAN cable is connected, and is used in data communication with the application server 130 via an unillustrated router or the network 120. This data communication may be wirelessly performed by, for example, an interface corresponding to radio waves. A system bus 409 is used for data transmission of various mechanisms.

Figure 5:
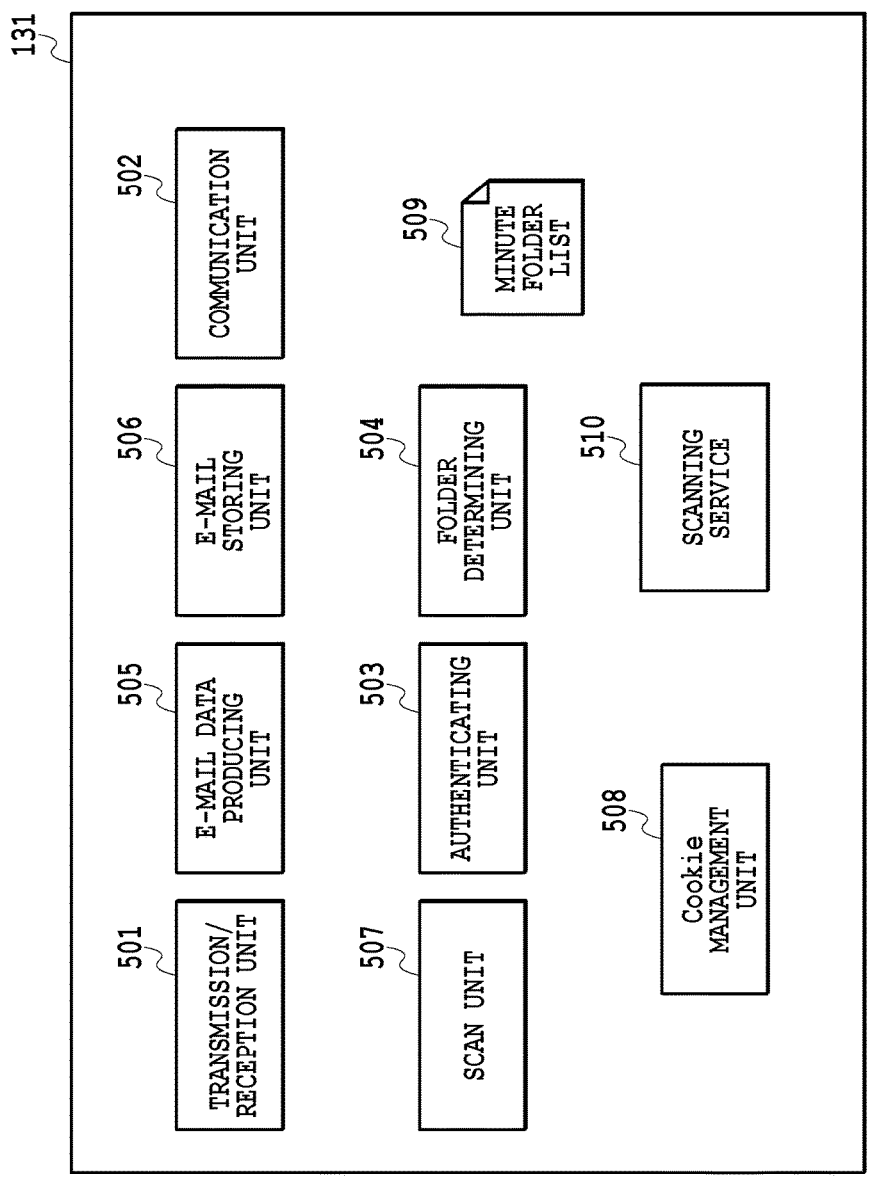
FIG. 5 is a diagram illustrating the software configuration in an application.

FIG. 5 is a diagram illustrating the software configuration of the application 131 included in the application server 130. A transmission/reception unit 501 performs production of a Web page for supply to the client 110 and transmission/reception of information. The transmission/reception herein includes ciphered communication. A communication unit 502 conducts communication with the Web mail server 140. In the present embodiment, an IMAP 4 is used as a communication protocol for communication. In the present embodiment, as described later, e-mails are stored in a draft folder of the Web mail service. Since the IMAP (IMAP 4) is used for communication at this time, the e-mail can be stored in the folder designated in the Web mail service, which is different from e-mail transmission using SMTP or POP.

An authenticating unit 503 transmits ID and a password that are account information through the communication unit 502 for a login to the Web mail service 141. The authentication information for the login includes the ID and the password, and besides, may include an e-mail address, a telephone number, a nickname and the like, and a combination thereof.

A minute folder list 509 is a file that stores a list of folder names minute folders of which correspond to all the languages usable in the Web mail service 141 to be prepared for the respective languages. In the present embodiment, the minute folder indicates a folder for storing e-mail software and a minute e-mail on the Web mail. A folder determining unit 504 refers to the folder list and the minute folder list 509 on the Web mail service 141 to determine a storage destination of the minute e-mail in the Web mail service 141.

A scan unit 507 invokes the MFP management service 133 to provide a list of scan-possible MFPs to the client 110 and receive various kinds of setting items. At this time, a scan service 510 provides a scan setting screen specific in the designated MFP to the client 110 to receive various kinds of setting items. Thereafter, the scan unit 507 transmits a command of a scan instruction to the designated MFP 150, and when the scan is completed, receives a notice thereof. The command of the scan instruction includes at least the scan setting and information on an upload destination of the obtained image data. In the present embodiment, the information of the upload destination is a URL specific in the temporary storing storage 134.

A Cookie management unit 508 performs writing-in, reading-in and deletion of Cookie to the browser 111 of the client 110. At the time of the writing-in or reading-in, encoding and decoding of values are performed.

An e-mail data producing unit 505 performs production of an e-mail to which the image stored in the temporary storing storage 134 is attached and deletion of the image stored in the temporary storing storage 134. An e-mail storage unit 506 provides a minute attribute to the e-mail produced in the e-mail producing unit 505, and stores the e-mail in a storage destination in the e-mail server 140 determined in the folder determining unit 504. The minute attribute herein is an attribute that indicates being in a minute state to the e-mail.

FIG. 6 is a diagram explaining activation sequence of the application 131 in the read image transmitting system according to the present embodiment. The respective processes to be executed by the application 131 are realized by executing programs stored in the ROM 203 or HDD 206 by the CPU 201.

When a user has access to the application 131 through the browser 111 of the client 110 (S601), the application 131 provides an account information input screen to the browser 111 for display (S601r).

Figure 7:
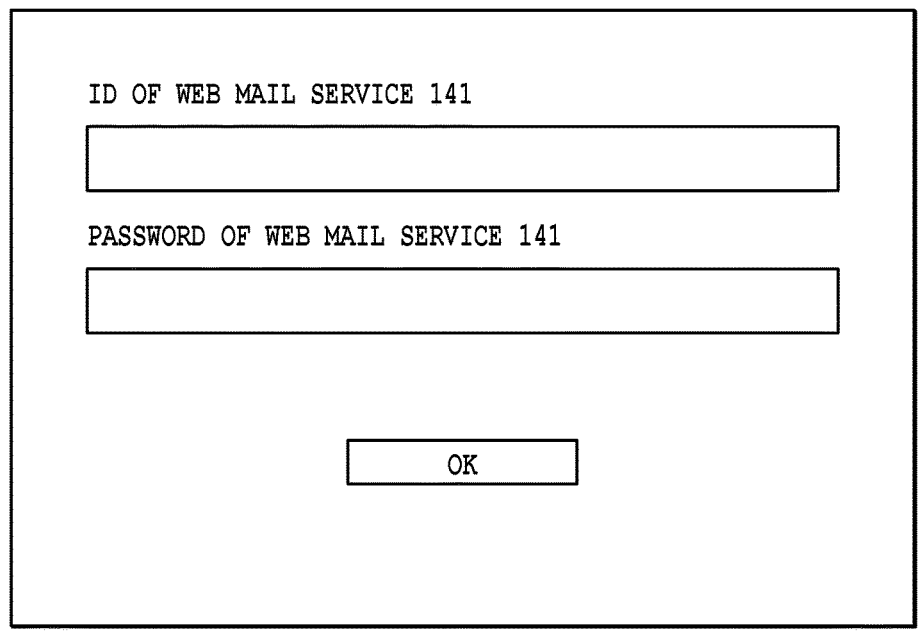
FIG. 7 is a diagram illustrating an example of a screen displayed in a browser.

FIG. 7 is a diagram illustrating an example of a screen displayed in the browser 111. A user confirms the display screen and fills the ID and password for the Web mail service in each text box. Thereafter, when the user clicks (touches) a OK button, these pieces of information are transmitted to the application 131 (S602).

When the account information is received, the authenticating unit 503 in the application 131 transmits the account information received in S602 to the Web mail service 141 (S603). The Web mail service 141 approves a login to the application 131 when it is determined that the received account information is correct (S603r).

When the login is confirmed, the folder determining unit 504 requests a list of minute folders to the Web mail service 141 in the application 131 (S604) to obtain the list registered therein (S604r). Thereafter, the folder determining unit 504 compares the received list of the minute folders with the minute folder list 509 stored in the application 131 to determine the storage destination of the minute e-mail (S605).

FIG. 8 is a diagram illustrating an example of folder names stored in the minute folder list 509. The minute folder list 509 is composed of a text file, wherein a name 801 of the Web mail service 141 to be used, and minute folder names 802, 803, . . . 80X to be used in the Web mail service 141 are enumerated according to the respective languages. The application 131 compares the folder names from the top rank to the second layer in the folder list obtained in S604r with the stored minute folder names in the order of 802, 803, . . . 80X and determines the folder name that is first matched, as the storage destination of the minute e-mail. According to the present embodiment, since the minute folder list 509 is thus managed to be separated from the program, it is possible to relatively easily and accurately associate the folder name of the application 131 with the minute folder name of the Web mail service 141. For example, even when the minute folder name is changed, the associating can be maintained simply by replacement of the folder name without rewriting the mail data.

It should be noted that, in FIG. 8, the explanation is made of a case where the minute folder name of the Web mail service 141 differs for each of the languages, but, not limited thereto, a constant folder name may be used regardless of the language. In addition, the folder name for comparison is not limited to those to the second layer, but all the folder names obtained may be compared with the minute folder list 509. Further, when the minute folder names in the Web mail service 141 can be accurately determined, the minute folder list 509 may be not necessarily composed of the text file. For example, a CSV file may be used.

FIG. 6 will be referred back to. When the storage destination of the minute e-mail is determined in S605, the Cookie management unit 508 writes the account information obtained in S602 and the folder name determined in S605 in Cookie of the browser 111 (S606).

Thereafter, the authenticating unit 503 logs out from the Web mail service 141 via the communication unit 502 (S607). When the logout is confirmed (S607r), the application 131 transmits the scan setting screen to the browser 111 through the transmission/reception unit 501 (S608).

Figure 9:
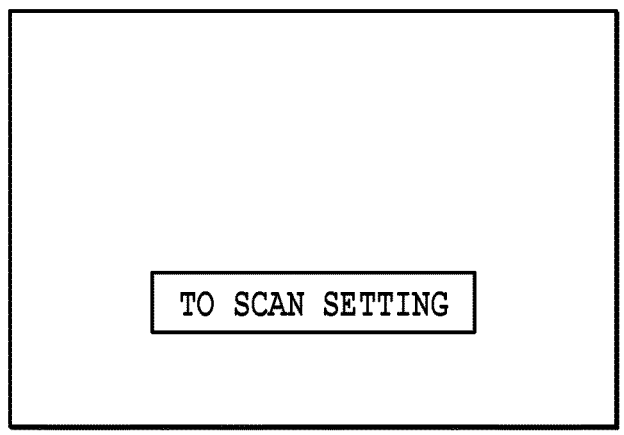
FIG. 9 is a diagram illustrating an example of a scan setting screen displayed in the browser.

FIG. 9 is a diagram illustrating an example of a scan setting screen displayed in the browser 111. A user clicks (touches) a button of "to scan setting" in the screen, thereby making it possible to start an actual operation of the scan-to-e-mail (S609).

FIGS. 10A and 10B are diagrams explaining a series of processes from the scanning of an image to the storing of a minute e-mail. As similar to FIG. 6, each of processes to be executed by the application 131 is realized by executing programs stored in the ROM 203 or HDD 206 by the CPU 201. When the application 131 receives a start command of scan-to-e-mail from the client 110 (S609), the application 131 first transmits a scan setting start instruction to the MFP management service 133 in the application server 130 (S1101). In response to receiving the scan setting start instruction, the MFP management service 133 provides an MPF setting screen to the browser 111 for the MFP 150 to perform a scan operation (S1102).

FIG. 11 is a diagram illustrating an example of the MPF setting screen displayed in the browser 111. Here, MPF kinds, original types, original sizes, data formats and resolutions can be selectively set. A user selects the various kinds of items in the screen, and then, clicks (touches) the "scan start" button. As a result, the scan start instruction is transmitted to the MFP management service 133 (S1103).

In response to receiving the scan start instruction, the MFP management service 133 transmits the scan start instruction as well as an address of the MPF and selection contents of the various items selected on the screen to the application 131 (S1104). In the application 131 having received this transmission, the scan unit 507 transmits the scan start instruction as well as an upload destination of the scanned image and information of the selection contents of the various items (S1105). In the present embodiment, the upload destination of the scanned image is set to the temporary storing storage 134. In addition, in S1105 the application 131 determines a storage location (for example, a folder) in the temporary storing storage 134 for the MFP 150 to store the scanned image, and provides the scan start instruction including information indicating the storage location (for example, the folder).

The MFP 150 that has received the scan start instruction in S1105 performs a scan operation according to the set content (S1106), and uploads the obtained image data to the temporary storing storage 134 (S1107). It should be noted that at this time, the MFP 150 uploads the image data on the storage location indicated by the information included in the above scan start instruction. Thereafter, the MFP 150 gives a notice that the scan operation is completed to the application 131 (S1108). This scan completion notice includes therein the information that indicates the above storage location.

The application 131 that has received a scan operation completion signal uses the account information stored in the Cookie in S606 in FIG. 6 to log in the Web mail service 141 via the authenticating unit 503. Specifically the authenticating unit 503 transmits the account information of Cookie to the Web mail service 141 via the communication unit 502 (S1109). The Web mail service 141 approves a login to the application 131 when it is determined that the received account information is correct (S1109r).

When the login is confirmed, the e-mail data producing unit 505 in the application 131 has access to the temporary storing storage 134 (S1110) to obtain the uploaded image data (S1110r). It should be noted that the e-mail data producing unit 505 specifies the storage location (for example, a folder in the temporary storing storage 134) indicated by the information included in the scan completion notice and obtains the image data from the specified storage location.

As described above, since the information indicating the storage location of the scanned data is included in the scan instruction and the scan completion notice, even in a case where the scan instruction is given to many MFPs, it is possible to appropriately obtain the scanned data obtained by the scan instructed by the scan instruction. In addition, as another method, the storage location and the specific information for specifying the scan instruction may be included in the scan instruction in S1105, for example. Also the scan completion notice includes the specified information. In addition, when the specified information and the storage location are made associated to be stored in the application server 130, the storage location (storage location for reading the scanned data) can be recognized from the scan completion notice. Also in this method, even in a case of performing the scan instruction to many MFPs, it is possible to appropriately obtain the scanned data obtained by the scan instructed by the scan instruction.

In addition, as described above, the application 131 (application server 130) obtains the scanned data from the temporary storing storage 134 in response to the scan completion notice from the MFP 150 in S1108. Another different method of obtaining the scanned data is, for example, a method where the application 131 makes inquiries to the temporary storing storage 134 periodically about presence/absence of the scanned data, and obtains the scanned data in a case where the scanned data is stored in the temporary storing storage 134. However, according to this method, in a case where the application server 130 manages many MFPs, it is required to make the above inquiries to all the MFPs periodically. Therefore, as described above, when the scanned data is obtained in response to the scan completion notice, even in a case where many MFPs are managed, the application server 130 may obtain the scanned data in regard to the MFP in which the scan is completed. Therefore, the processing load of the application server 130 can be reduced to be less than in the above-described other method.

The application 131 produces an e-mail to which the obtained image data is attached (S1111). At this time, in a case where the image data obtained by the scanning of the MFP 150 amounts to a plurality of pages, the image data in the plurality of pages is united to one image data, and the united image data may be attached to a desired e-mail. When the e-mail is completed, the application 131 deletes the image data in the temporary storing storage 134 (S1112 and S1112*r*).

Thereafter, the e-mail storing unit 506 in the application 131 has access to the Web mail service 141 to request storage of the e-mail produced by the e-mail data producing unit 505 in S1111. Specifically the e-mail storing unit 506 transmits the e-mail produced in S1111 and the information in which a draft attribute is given to the folder name written in Cookie in S606 in FIG. 6 to the Web mail service 141 through a given Web API provided by the Web mail service (S1113). The Web mail service 141 that has received these pieces of information stores the received e-mail as a minute in the designated folder, and gives a notice of the storage completion to the application 131 (S1113*r*).

In the application 131 that has confirmed the storage, the authenticating unit 503 logs out through the communication unit 502 (S1114). When the logout is confirmed (S1114*r*), the application 131 gives a notice that the production of the e-mail is completed to the browser 111 through the transmission/reception unit 501 (S1115). Thereby, the scan of the image and the storage of the minute e-mail attached to the scanned image are completed.

It should be noted that in the above description, the explanation is made of a case where the image scanned in the MFP 150 is attached to the e-mail without any change. In the application 131, however, the image data may be subjected to various kinds of processing, for example, be converted to a PDF, subjected to Zip compression or provided with a password.

According to the present embodiment explained as above, transmission of data between the client 110, the MFP 150 and the e-mail server 140 is all performed through the application server 130. In the application server 130, the folder name list associated with the folders included in the e-mail server 140 is stored. Therefore, the image data obtained by the scan of the MFP 150 is transmitted to the Web mail service without being temporarily stored in the client 110 as a terminal, wherein the image data can be stored and managed in a given folder. In addition, an edition or transmission instruction of an e-mail is made possible from the information terminal 160, not via the client computer 110.

Another method of registering the e-mail to which the read image is attached in the Web mail service as described above may include the following method. For example, the MFP 150 transmits the read image to the client, the client 110 is operated to access to the Web mail service, and further, the client 110 is operated to store the e-mail, to which the read image is attached, in the draft folder in the Web mail service. In this method, a user is required to operate the client 110 in addition to the operation to the MFP.

On the other hand, according to the processing in the present embodiment, the application server 130 executes the processing of production of an e-mail and transmission of the email to the Web mail service and the like without instructions from a user. That is, the application server 130 automatically performs production of the e-mail to which the scanned image (read image) is attached and transmission of the e-mail to the Web mail service as an external server, in response to the scan completion notice (reading completion notice of an original) from the MFP 150. The Web mail service stores the received e-mail in the minute folder (draft folder).

Therefore, without a user's operation to the client 110 or to the operating part to the application server 130, the above e-mail can be automatically stored in the draft folder in the Web mail service in response to the user's operation to the MFP 150. Therefore, the user can easily store the above e-mail in the draft folder in the Web mail service.

Second Embodiment

Figure 12:
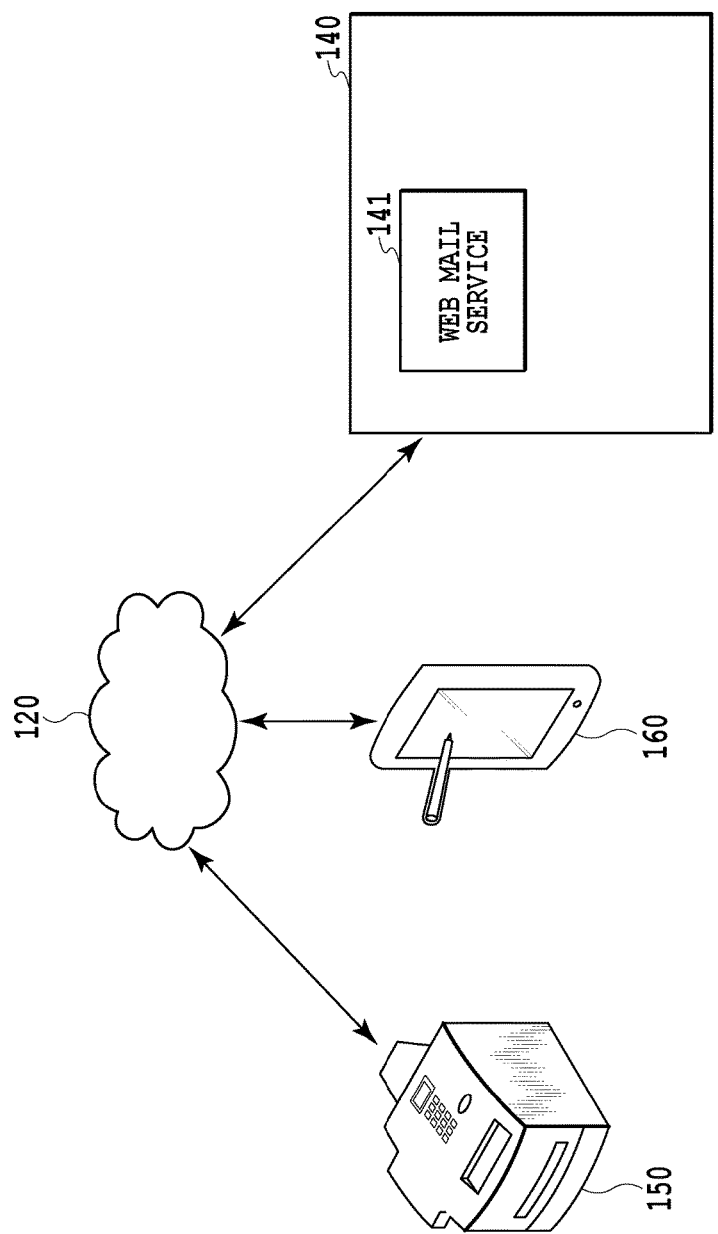
FIG. 12 is a diagram illustrating the configuration of a read image transmitting system used in a second embodiment of the present invention.

FIG. 12 is diagrams illustrating the configuration of a read image transmitting system used in the present embodiment. In the present embodiment, an explanation will be made of the form of operating a function similar to that of the application 131 in the first embodiment by the MFP 150.

Figure 13:
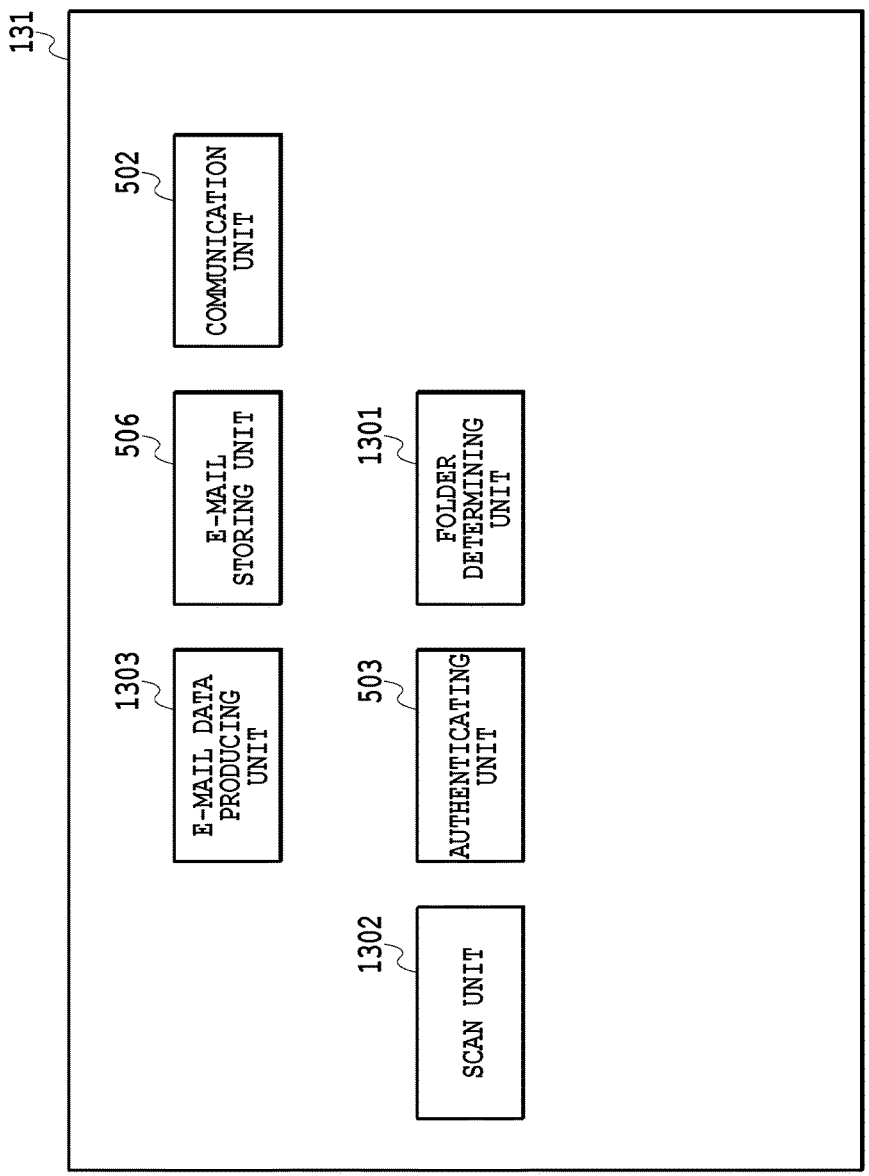
FIG. 13 is a diagram illustrating the software configuration in an application incorporated in an MFP.

FIG. 13 is a diagram illustrating the software configuration of the application 131 incorporated in the MFP 150. The application 131 operates on the MFP 150, performs UI display on the display panel 406 and receives a user's operation from the operation panel 407. In addition, the application 131 produces an e-mail to which an image obtained by the scan of the MFP 150 is attached, and stores this e-mail in the Web mail service. That is, programs similar to those in the application 131 stored in the HDD 206 in the application server 130 are stored in the ROM 403 in the MFP 150. The MFP 150 can realize the function similar to that of the application server 130 by executing the program with the CPU 401. It should be noted that since the communication unit 502, the authenticating unit 503 and the e-mail storing unit 506 are similar to those in the first embodiment, an explanation thereof is omitted.

Figure 14:
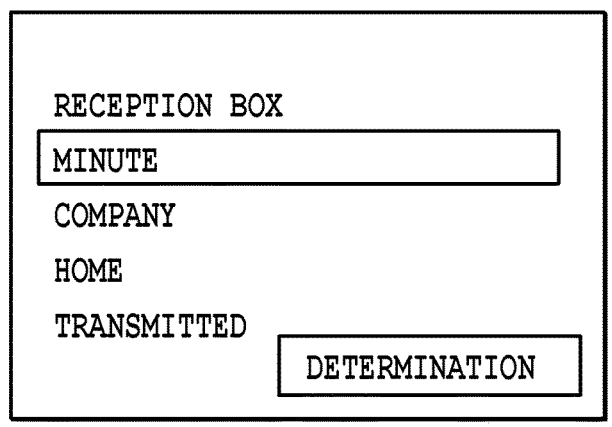
FIG. 14 is a diagram illustrating a setting screen displayed in an operation panel.

A folder determining unit 1301 determines the storage destination of a minute e-mail in the Web mail service 141. Here, display control of displaying the folder list managed in the Web mail service 141 together with items illustrated in FIG. 14 on the operation panel 407 is performed to receive input from a user. However, this configuration does not limit the present embodiment. The folder determining unit 1301 in the present embodiment also may be the configuration similar to that of the folder determining unit 504 in the first embodiment.

Figure 15:
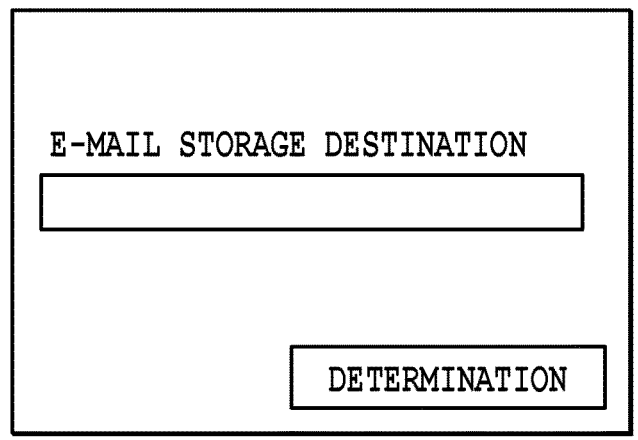
FIG. 15 is a diagram illustrating a folder input screen displayed in the operation panel.

In addition, another aspect of the present embodiment may be made such that a folder input screen as illustrated in FIG. 15 is displayed to a user, a folder based upon a file name that is input by the user is newly produced in the Web mail service 141 and the folder is determined as the storage destination of the minute e-mail. Further, e-mail data stored on the Web mail service 141 may be obtained to determine a folder in which the e-mail data to which minute attributes are given is already stored, as an e-mail storage destination folder.

FIG. 13 will be referred back to. A scan unit 1302 drives the scan engine 405 through the scan engine IF404 to perform a scan operation. An e-mail data producing unit 1303 produces an e-mail to which image data obtained by the scan engine 405 is attached.

Figure 16:
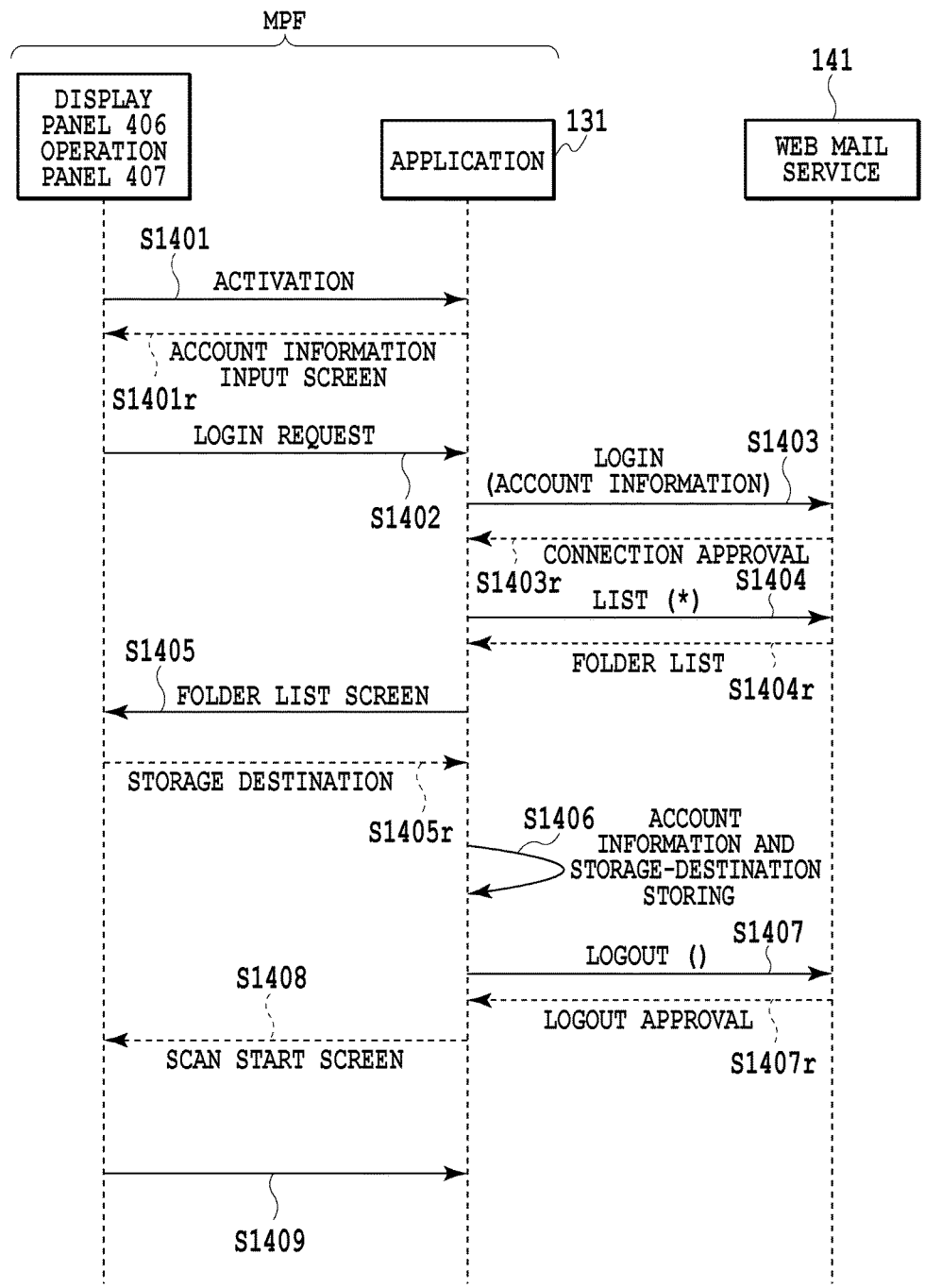
FIG. 16 is a diagram explaining activation sequence in the application.

FIG. 16 is a diagram explaining activation sequence of the application 131 in the read image transmitting system of the present embodiment. The respective processes to be executed by the application 131, the display panel 406 and the operation panel 407 are realized by executing programs stored in the ROM 403 by the CPU 401 in the MFP 150. When a user activates the application 131 through the display panel 406 and the operation panel 407 (S1401), the application 131 provides an account information input screen illustrated in FIG. 7 on the display panel 406 (S1401r). When the user makes various settings and clicks an OK button, a login request is input to the application 131 (S1402). In the application 131 that has received the login request, the authenticating unit 503 transmits the account information (ID and password) to the Web mail service 141 (S1403). The Web mail service 141 approves a login to the application 131 when it is determined that the received account information is correct (S1403r).

When the login is confirmed, in the application 131 the folder determining unit 1301 requests a list of minute folders to the Web mail service 141 (S1404) to obtain the list (S1404r). Thereafter, the folder determining unit 1301 adds the received list to the folder list illustrated in FIG. 14 included in the application 131, which is displayed on the display panel 406 (S1405).

The user confirms the displayed screen to determine a folder of the storage destination through the operation panel 407 (S1405r). The application 131 stores the received folder information together with the account information obtained in S1402 in the RAM 402 (S1406).

Thereafter, the authenticating unit 503 logs out of the Web mail service 141 (S1407). When the logout is confirmed (S1407r), the application 131 displays the scan setting screen illustrated in FIG. 9 on the display screen 406 (S1408). The user clicks (touches) a button of "to scan setting" in the screen, thereby making it possible to start an actual operation of the scan-to-e-mail (S1409).

Figure 17B:
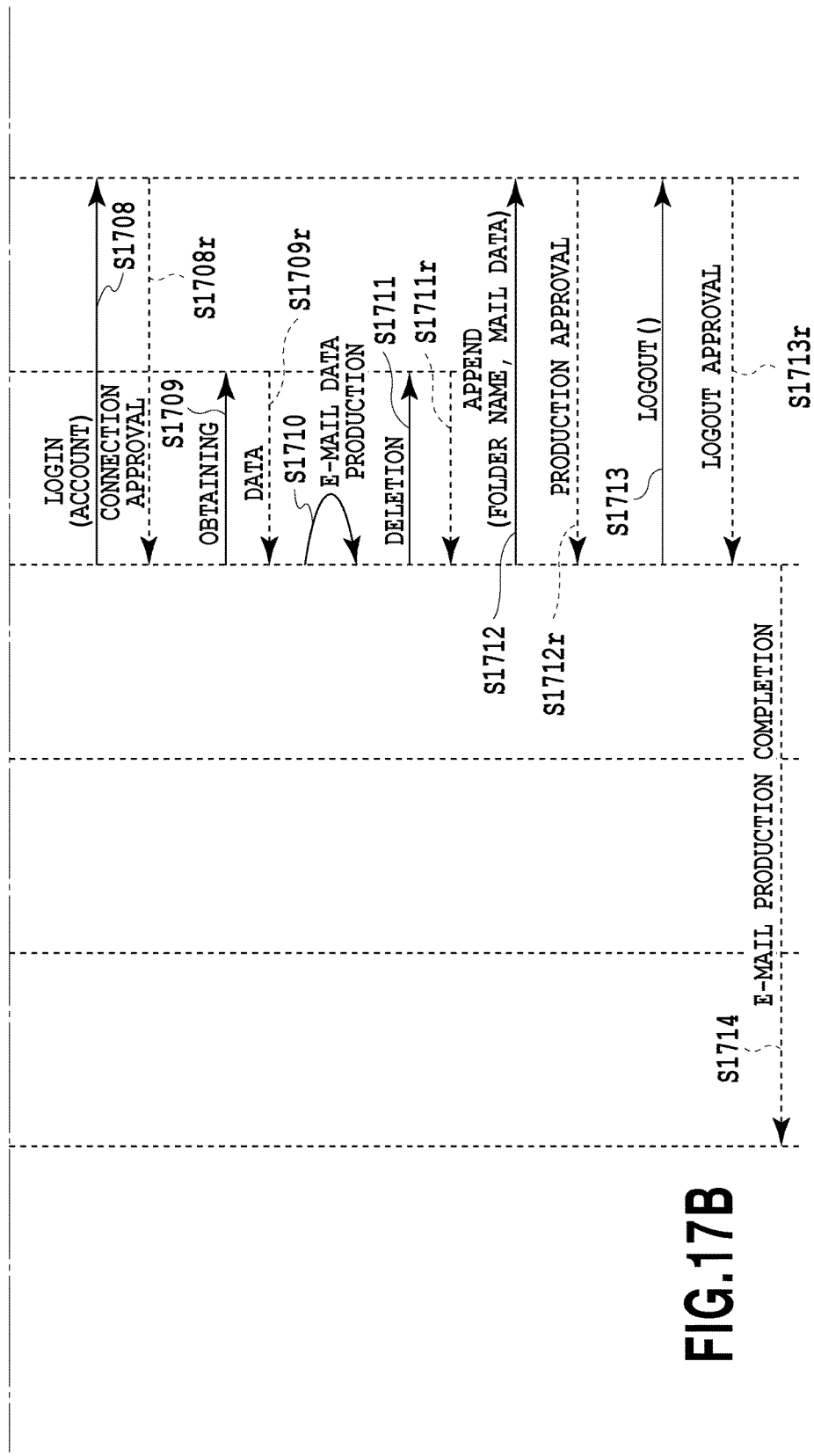
FIG. 17B is a process diagram from a point of scanning an image to a point of storing a minute e-mail.

FIGS. 17A and 17B are diagrams explaining a series of processes from the scanning of an image to the storing of a minute e-mail in the present embodiment. As similar to FIG. 16, the respective processes to be executed by the application 131, the display panel 406 and the operation panel 407 are realized by executing programs stored in the ROM 403 by the CPU 401 in the MFP 150. When a user gives a start command of scan-to-e-mail from the scan setting screen (S1409), the application 131 invokes the scan engine IF404 (S1701). The scan engine IF404 transmits an MPF setting screen to the display screen 406 to perform a scan operation (S1702).

FIG. 18 is a diagram illustrating an example of the MPF setting screen displayed in the display panel 406. Here, original types, original sizes, data formats and resolutions can be selectively set. A user selects the various items respectively in the screen, and then, clicks (touches) the "scan start" button. As a result, the scan start instruction is transmitted to the scan engine IF404 (S1703).

The scan engine IF404 that has received the scan start instruction drives the scan engine 405 (S1704) to perform a scan operation according to the set various items (S1705). At this time, the scan engine 405 stores the read image data in the RAM 402 (S1706). When it is confirmed that the storage of the image data is completed (S1706r), the scan engine 405 gives a notice that the scan operation is completed to the scan engine IF404. The scan engine IF404 that has received the notice of the scan operation completion notifies the application 131 of the storage destination of the image data (S1707).

When the application 131 receives the notice of the storage destination, the authenticating unit 503 in the application 131 uses the account information stored in the RAM 402 in S1406 to log in the Web mail service 141 (S1708). Confirming the logging in (S1708r), the application 131 has access to the RAM 402 (S1709) to obtain the stored image data (S1709r). The e-mail data producing unit 1303 produces an e-mail to which the obtained image data is attached (S1710). When the e-mail is completed, deletion of the image data is requested of the RAM 402 (S1711), which will be confirmed (S1711r).

Thereafter, the e-mail storing unit 506 in the application 131 has access to the Web mail service 141 to request storage of the e-mail that the e-mail data producing unit 505 has produced in S1710. Specifically the e-mail produced in S1710 and the information that a minute attribute is given to the folder name stored in the RAM 402 in S406 in FIG. 16 are transmitted to the Web mail service 141 (S1712). The Web mail service 141 that has received these pieces of information stores the received e-mail as a minute in the designated folder, and gives a notice of the storage completion to the application 131 (S1712r).

In the application 131 that has confirmed the storage, the authenticating unit 503 logs out of the Web mail service 141 (S1713). When the logout is confirmed (S1713r), the application 131 displays an event that the production of the e-mail is completed on the display panel 406 (S1714). Thereby, the scan of the image and the storage of the minute e-mail attached to the scanned image are completed.

According to the present embodiment explained as above, transmission of data between the scan engine 405 in the MFP 150 and the mail server 140 is all performed through the application 131 incorporated in the MFP 150. Therefore, the image data obtained by the scan of the scan engine 405 in the MFP 150 can be simply transmitted to the Web mail service, and stored and managed in a given folder without being stored in the application exclusive to the scanner.

Other Embodiments

It should be noted that in the above-mentioned embodiment, the explanation is made of a case of using the IMAP 4 as the communication protocol to the Web mail service 141, but the present embodiment is not limited thereto. Any communication protocol, such as a WEB API specific in the Web mail service, which can store an e-mail on the Web mail service 141 or obtain folder information, may be used.

In addition, in the above-mentioned embodiment, after the scan completion notice is given, the scanned data is obtained and further, the e-mail is produced. However, the order of the process is not limited thereto. For example, after a command of a scan start instruction is given, an e-mail may be produced before the scan completion notice is given. In a case where the scan completion notice is received, the read image may be obtained and the obtained read image may be attached to the e-mail preliminarily produced.

It should be noted that in the above-mentioned embodiments, the explanation is made of the processing in the device such as the application server 130 or the MFP 150 that is different from a server in the Web mail service, but, not limited thereto, the server of the Web mail service may execute the processing of the application server 130 in the above embodiments. Specifically the server gives a scan instruction to the MFP 150, and performs production of an e-mail, attachment of scanned data to the e-mail, and storage of the e-mail to a draft folder, in response to reception of the scanned data.

In addition, in the above-mentioned embodiments, the explanation is made by taking a case of attaching the image data obtained by the scanning function in the MFP to the e-mail as an example, but the present invention is not limited thereto. As long as a function of being able to obtain an image is provided, even in a case where for example, in a digital camera, an image obtained from another function different from the scanning function is attached to an e-mail, the present invention can be executed effectively.

Further, the function of the present embodiment can be realized by the following configuration. That is, the function of the present embodiment is achieved also in such a manner that a program code is supplied to a system or device for executing the processing of the present embodiment, and a computer (CPU or MPU) in the system or device executes the program code. In this case, the program code itself that is read out from a storage medium is to realize the function of the aforementioned embodiment, and the storage medium that has stored therein the program code also realizes the function of the present embodiment.

In addition, the program code for realizing the function of the present embodiment may be executed by a single computer (CPU or MPU) or in cooperation with a plurality of computers. Further, the program code may be executed by a computer or hardware such as a circuit for realizing the function of the program code may be provided. In addition, a part of the program code may be executed by hardware and the rest may be executed by a computer.

The storage medium for supplying the program code may include, for example, a flexible disk, a hard disk, an optical disk, an optical magnetic disk, a CD-ROM, a CD-R, a magnetic tape, a memory card of a non-volatile memory, a ROM, a DVD or the like. In addition, the present invention also includes a case where an operating system (OS) working on a computer or the like executes apart or all of actual processing based upon an instruction of the program code read out by the computer and the aforementioned embodiment is realized by the processing.

Further, the program code that is read out from the storage medium may be written in a memory provided in an extensions board inserted in a computer or an extensions unit connected to a computer. This case includes an event that a CPU or the like provided in the extensions board or extensions unit executes a part or all of actual processing based upon an instruction of the program mode, and the aforementioned embodiment is realized by the processing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-138883 filed Jul. 4, 2014, which is hereby incorporated by reference wherein in its entirety.

What is claimed is:

1. An information processing system comprising an instructing device, an image obtaining device and a server system, which are connected to each other in a network independently,
  wherein the server system comprises at least one processor configured to control:
    an instruction reception unit to receive an instruction from the instructing device;
    a first transmitting unit to transmit an obtaining command to the image obtaining device based on the instruction;
    a reception unit to receive image data obtained by the image obtaining device in response to the obtaining command, wherein the image obtaining device obtains the image data not via the network;
    a producing unit to produce an e-mail, to which the image data is attached, in response to the reception of the image data by the reception unit; and
    a second transmitting unit to transmit the e-mail to a Web mail service such that the e-mail is stored in a predetermined folder of the Web mail service in response to the production of the e-mail by the producing unit,
  wherein the at least one processor controls the second transmitting unit to transmit the e-mail and minute attribution information indicating that the e-mail is in a minute state, to the Web mail service, and
  wherein the Web mail service stores the e-mail in a minute folder as the predetermined folder, based on the minute attribute information, which is received from the second transmitting unit.

2. The information processing system according to claim 1, wherein the image obtaining device stores the image data in a predetermined storage location in response to obtaining the image data and gives a notice in regard to completion of obtaining the image data to the server system, and
  wherein the reception unit receives the image data from the predetermined storage location in response to the notice.

3. The information processing system according to claim 2, wherein the obtaining command includes a command to obtain the image data and information of the predetermined storage location in which the image obtaining device should store the image data, and
wherein the reception unit receives the image data from the predetermined storage location in response to the notice.

4. The information processing system according to claim 1, wherein the image obtaining device obtains the image data by reading an original.

5. The information processing system according to claim 1, wherein the at least one processor further controls an authenticating unit to log in to the Web mail service at a time of communicating with the Web mail service.

6. The information processing system according to claim 1, wherein the at least one processor further controls a determining unit to determine a folder in the Web mail service for the e-mail produced by the producing unit to be stored in.

7. The information processing system according to claim 6, wherein the at least one processor controls the determining unit to determine the folder for storing the e-mail by comparing first names of folders prepared in the Web mail service with second names of folders indicated by information stored in the server system.

8. The information processing system according to claim 6, wherein the at least one processor further controls:
a display control unit to display a list of folders prepared in the Web mail service on a display device, and
the determining unit to determine a folder selected by a user in the list displayed by the display control unit, as the predetermined folder for storing the e-mail.

9. The information processing system according to claim 6, wherein the at least one processor further controls the determining unit to add and determine another folder in which the e-mail can be stored according to an instruction by a user.

10. The information processing system according to claim 6, wherein the at least one processor further controls the determining unit to determine a folder in which the e-mail is already stored out of folders prepared in the Web mail service as the predetermined folder for storing the e-mail.

11. The information processing system according to claim 1, wherein the at least one processor further controls the producing unit to unite the image data corresponding to a plurality of pages, obtained by the image obtaining device to one image data, and to attach the united image data to the e-mail.

12. The information processing system according to claim 1, wherein the instructing device does not handle the image data.

13. The information processing system according to claim 6, wherein the at least one processor further controls an acquisition unit to acquire folder information relating to folders prepared in the Web mail service, from the Web mail service, and
wherein the at least one processor further controls the determining unit to determine the folder for the e-mail, from the folders prepared in the Web mail service, based on the folder information acquired by the acquisition unit.

14. The information processing system according to claim 13, wherein the at least one processor further controls an authentication unit to log in to the Web mail service using authentication information input by a user, and
wherein the at least one processor further controls an acquisition unit to acquire the folder information from the Web mail service, based on the login by the authentication unit.

15. The information processing system according to claim 1, wherein the at least one processor further controls a third transmitting unit to transmit screen information about a display screen on which a user performs the instruction, to the instructing device, and
wherein the instruction performed by the user on the display screen, which is displayed by the instructing device based on the screen information, is received by the instruction reception unit.

16. The information processing system according to claim 1, wherein the transmitting by the first transmitting unit, the reception by the reception unit, the producing by the producing unit, and the transmitting by the second transmitting unit are performed after the instruction is received from the instructing device, without further instructing from the instructing device.

17. An information processing method for a server system of an information processing system that includes an instructing device, an image obtaining device and the server system, which are connected to each other in a network independently, the method comprising:
receiving an instruction from the instructing device;
transmitting an obtaining command to the image obtaining device based on the instruction;
receiving image data obtained by the image obtaining device in response to the obtaining command, wherein the image obtaining device obtains the image data not via the network;
producing an e-mail, to which the image data is attached, in response to the reception of the image data; and
transmitting the e-mail to a Web mail service such that the e-mail is stored in a predetermined folder of the Web mail service in response to the production of the e-mail,
wherein the e-mail and minute attribute information indicating that the e-mail is in a minute state, are transmitted to the Web mail service, and
wherein the Web mail service stores the e-mail in a minute folder as the predetermined folder, based on the minute attribute information.

18. A server system for storing an e-mail, to which image data obtained by an image obtaining device connected in a network is attached in a Web mail service, the server system comprising at least one processor,
wherein the at least one processor controls:
an instruction reception unit to receive an instruction from an instructing device;
a first transmitting unit to transmit an obtaining command to the image obtaining device based on the instruction;
a reception unit to receive the image data obtained by the image obtaining device in response to the obtaining command, wherein the image obtaining device obtains the image data not via the network;
a producing unit to produce an e-mail, to which the image data is attached, in response to the reception of the image data by the reception unit; and
a second transmitting unit to transmit the e-mail to the Web mail service such that the e-mail is stored in a predetermined folder of the Web mail service in response to the production of the e-mail by the producing unit,
wherein the at least one processor controls the second transmitting unit to transmit the e-mail and minute attribute information indicating that the e-mail is in a minute state, to the Web mail service, and wherein the Web mail service stores the e-mail in a minute folder as the predetermined folder, based on the minute attribute information, which is received from the second transmitting unit.

19. The server system according to claim 18, wherein the server system consists of one server device.

20. The server system according to claim 18, wherein the at least one processor further controls an authenticating unit to log in to the Web mail service at a time of communicating with the Web mail service.

21. An information processing system comprising an instructing device, an image obtaining device, and a server system, which are connected to each other in a network independently, wherein the server system comprises at least one processor configured to control:

an instruction reception unit to receive an instruction from the instructing device;

a first transmitting unit to transmit an obtaining command to the image obtaining device based on the instruction;

a reception unit to receive image data obtained by the image obtaining device in response to the obtaining command, wherein the image obtaining device obtains the image data not via the network;

a producing unit to produce an email, to which the image data is attached, in response to the reception of the image data by the reception unit;

a determining unit to determine a folder in a Web mail service for the e-mail produced by the producing unit to be stored in, by comparing first names of folders prepared in the Web mail service with second names of folders indicated by information stored in the server system; and a second transmitting unit to transmit the email to a Web mail service such that the e-mail is stored in the folder of the Web mail service determined by the determining unit, in response to the production of the e-mail by the producing unit, wherein the second names are names of a minute folder corresponding to a plurality of languages, and wherein the at least one processor controls the determining unit to determine a folder having a name included in the second names, among the folders prepared in the Web mail service, as the folder for storing the e-mail.

22. The information processing system according to claim 21, wherein the plurality of languages are all languages usable in the Web mail service.

23. An information processing system comprising an instructing device, an image obtaining device, and a server system, which are connected to each other in a network independently, wherein the server system comprises at least one processor configured to control:

an instruction reception unit to receive an instruction from the instructing device;

a first transmitting unit to transmit an obtaining command to the image obtaining device based on the instruction;

a reception unit to receive image data obtained by the image obtaining device in response to the obtaining command, wherein the image obtaining device obtains the image data not via the network;

a producing unit to produce an e-mail, to which the image data is attached, in response to the reception of the image data by the reception unit;

an authentication unit to log in to a Web mail service using authentication information input by a user;

an acquisition unit to acquire folder information relating to folders prepared in the Web mail service, from the Web mail service, based on the login by the authentication unit;

a determining unit to determine a folder in the Web mail service for the e-mail produced by the producing unit to be stored in, from the folders prepared in the Web mail service, based on the folder information acquired by the acquisition unit; and a second transmitting unit to transmit the e-mail to a Web mail service such that the e-mail is stored in the folder of the Web mail service determined by the determination unit, in response to the production of the e-mail by the producing unit, wherein the at least one processor further controls the authentication unit to store the authentication information used in the login, and to log out from the Web mail service after the determination by the determining unit, wherein the at least one processor further controls the authentication unit to log in to the Web mail service again, for transmitting the e-mail by the second transmitting unit, using the authentication information stored by the authentication unit, and wherein the at least one processor further controls the second transmitting unit to transmit the e-mail, based on the login by the authentication unit.

* * * * *